Oct. 2, 1923. 1,469,751
L. W. CHASE ET AL
TWO-ROW LISTER
Filed Nov. 5, 1921 2 Sheets-Sheet 2
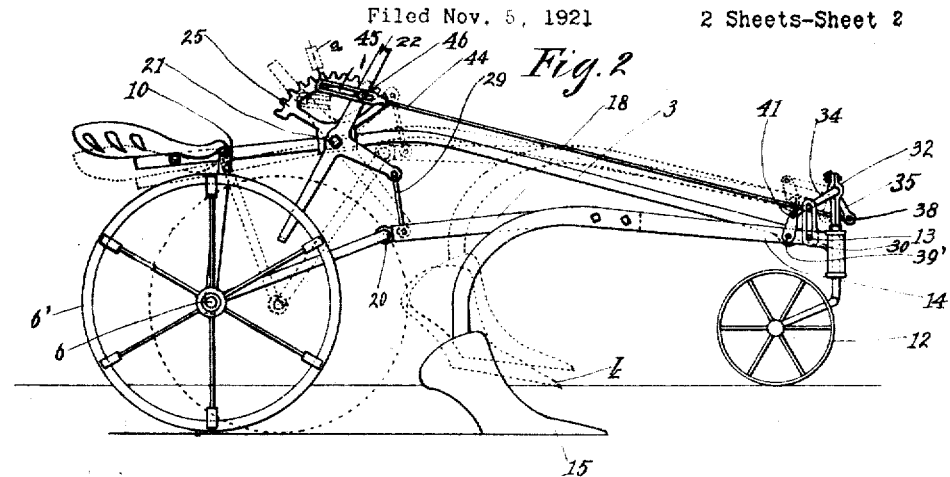
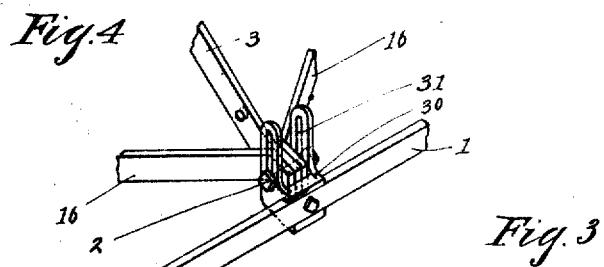
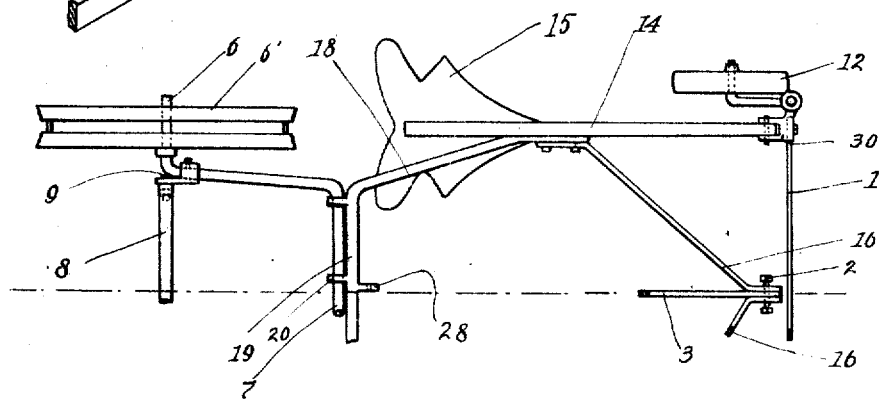
Inventors,
Leon W. Chase
William R. McGeachin
James C. Brand
by H. S. Johnson
their Attorney.

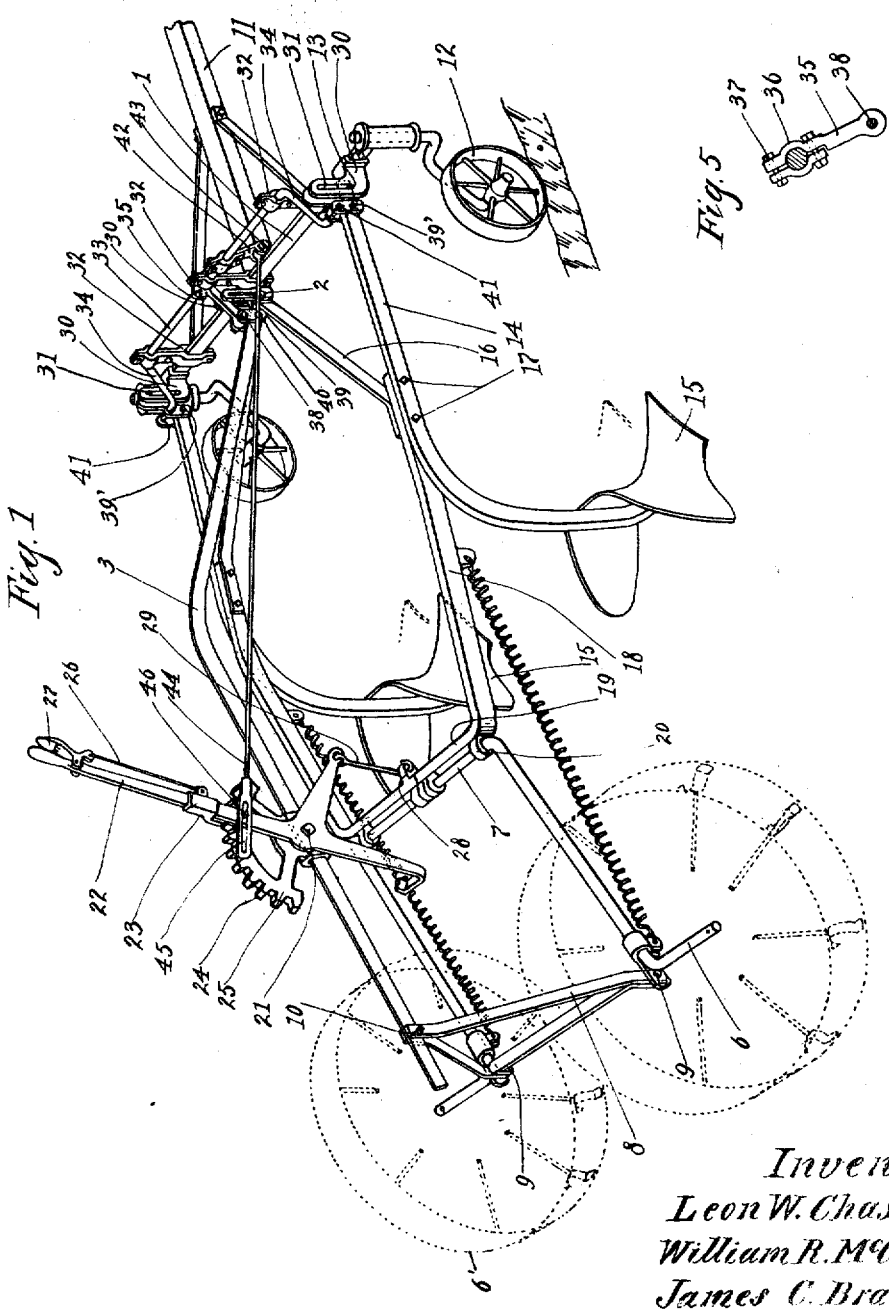

Patented Oct. 2, 1923.

1,469,751

UNITED STATES PATENT OFFICE.

LEON W. CHASE, WILLIAM R. McGEACHIN, AND JAMES C. BRAND, OF LINCOLN, NEBRASKA, ASSIGNORS TO CHASE PLOW COMPANY, OF LINCOLN, NEBRASKA, A CORPORATION OF NEBRASKA.

TWO-ROW LISTER.

Application filed November 5, 1921. Serial No. 513,082.

*To all whom it may concern:*

Be it known that we, LEON W. CHASE, WILLIAM R. MCGEACHIN, and JAMES C. BRAND, citizens of the United States, residing at Lincoln, in the county of Lancaster and State of Nebraska, have invented certain new and useful Improvements in Two-Row Listers, of which the following is a specification.

Our invention relates to improvements in agricultural implements, and more particularly to improvements in that class of machines having multiple plows with beams pivotally hitched to the frame, the plows being so mounted as to be readily shifted by the operator, from operative to inoperative position, and having a ground engaging wheeled element such as a wheeled truck and the like, whereby to hold the pivoted front ends of the plow beams a definite distance from the ground.

An object of the invention is to provide, in implements of the class described, means for manually controlling, from the position occupied by the operator, the vertical position of the pivotal connections connecting the plow beams to the frame, whereby the forward ends of the beams may be raised from normal operative position, to inoperative position, and be so held.

We have found, in the operation of listers and plows, that the best results are obtained, when the pivotal plow beam connection is held at a certain level above ground, which level is usually established by trial, for the various designs of beams.

It is also desirable, in the construction of implements of this class, to keep the structure as compact and simple as possible, without loss of efficiency. We have found, that in the construction of listers and plows, especially the former, wherein the plow beam is swung bodily upward upon its pivot, to raise it out of operative position, it is very difficult to provide lifting mechanism whereby the plows may be lifted sufficiently high, to satisfactorily clear the ground, especially at the ends of the fields, or for transportation from one place to another. When the swinging of a plow beam about its pivot is relied upon for the purpose of raising it, a relatively long plow beam is required, because it is desirable to raise the plow share in as nearly a perpendicular direction as is practical, but still at an angle sufficient to permit the nose of the share to initially enter the ground in the process of lowering the plow.

A further object of the invention is to provide, in an implement of the class described, means whereby the plow beam, in the process of raising it, is preferably, initially swung upon its pivot, and then raised bodily perpendicularly to inoperative position, whereby in the reversal of the movement, the nose of the share will initially enter the soil.

To this end the invention consists in the construction, combination and arrangement of parts hereinafter described and claimed.

In the accompanying drawings forming part of this specification:

Figure 1 is a perspective view of a multiple bottom lister, embodying our invention, the seed planting devices and cultivator disks not being shown.

Figure 2 is a side view of the lister, showing in dotted lines, the positions the parts assume when the plows are raised to inoperative position.

Figure 3 is a plan view showing half of the frame, the lifting mechanism being omitted.

Figure 4 is an enlarged fragmentary perspective view of the slidable connection connecting the central longitudinal frame member to the front cross beam, and Figure 5 is a perspective view of a lever arm forming part of the beam lifting mechanism.

Referring to the drawings, Figure 1, represents the skeleton body of a lister embodying our invention, the machine shown, consisting of a wheeled frame composed of a cross beam 1, having intermediate its ends, a pivot pin 2, to which is pivotally connected so as to swing vertically, the longitudinally centrally disposed bar 3, said bar being bent upwardly intermediate its ends to form an arch, and extending rearwardly above and beyond the transversely disposed axle 6, which latter is supported by the wheels 6' shown in dotted lines, in Figure 1. The axle is constructed in the form of a bail, having a straight cross member 7 disposed in parallelism with the cross beam 1, and the axis of the wheels, and is swingable vertically to bring its cross member into close proximity to the arch bar 3. The frame further consists of a triangular truss member 8, the ends of the base of the truss having pivotal connections 9, with the axle 6, and the apex of the truss having pivotal connection 10 with the arch bar 3.

The cross beam carries rigidly, centrally, midway of its ends, a suitable draft tongue 11, and is supported at its ends by the casters 12. Pivotally connected by means of the pivots 13, to the cross beam, so as to align longitudinally with the rear wheels, and arranged parallel to each other, are the plow beams 14, the latter extending rearwardly and in a curve downward, and carrying at their lower extremities the plow shares and mold boards 15. The pivotal connections of the plow beams, and that of the arch bar, are sufficiently loose to permit a substantially universal movement of the beams and bar, thereby rendering the frame flexible, whereby the cross beam is enabled to move in conformity to the irregularities of the ground.

The plow beams are held in parallelism by the brace members 16, the latter being pivoted collectively with the arch bar on the pivot pin 2. The outer ends of the braces, are rigidly fastened to the plow beams by means of the bolts 17, to hold the beams at right angles to the cross beam.

Secured to each of the plow beams, is the rearwardly extending arm 18, which may be termed a plow beam extension, the latter being bent inwardly so as to form a portion 19 parallel with the cross member 7, said portion having loose hinge connection 20 with said cross member.

Pivotally mounted on the arch bar 3, as by means of the pivot pin 21, is the upwardly extending bell crank lever 22, the long arm thereof being formed with a suitable handle, said arm slidably supporting the ratchet dog 23, which latter is adapted to engage the teeth 24, of the toothed segment 25, when it is slid thereagainst. The dog has rod connection 26, with a spring pressed, fulcrumed grip lever 27, whereby the dog is held locked under stress of the spring, between the teeth of the segment. Pivotally connected to the lug 28, which is positioned centrally longitudinally of the machine, and extends outwardly from one of the plow beam extensions 18, is the link 29, the outer end thereof being pivotally connected to the short arm of said bell crank lever, whereby, when said lever is actuated, the bail axle and extension beams may be raised at their hingedly connected ends, and so held by the ratchet mechanism.

The coil springs 30, extending, under tension, from the bail axle to the plow beam extensions 18, tend constantly to buckle the structure upwardly, so as to form an arch (Figs. 1 and 2) in which position it is normally held by the ratchet locking mechanism, when the plows are in operative position. These springs serve, to in part, counterbalance the weight of the hinged parts of the structure, whereby when the plows are lowered from inoperative position, shown in dotted lines (Fig. 2), to operative position, the lever 22 will be rendered easier of operation. As indicated in Figure 2, the truss member moves upon its pivots 9 and 10, when the plows are raised the arch bar 3 moving with it. A suitable seat 10' is provided for the operator.

Applicants do not claim the structure described in the foregoing, as their invention.

The form of our invention shown in the drawings, comprises brackets 30, suitably secured in lateral alignment to the cross beam 1, and formed with an upwardly extending slot 31, wherein is adapted to slide the transversely disposed pivot pins 2 and 13, whereby the front ends of the plow beams and the group of frame members 3 and 16, are rendered vertically slidable. The brackets may be termed pivot guides, whereby the forward ends of the plow beams are held at a uniform distance from the ground.

Extending upwardly from the cross beam 1, and secured thereto, are a plurality of laterally aligned journal supports 32, formed with aligned journal boxes at their upper extremities, wherein is rotatably supported the crank shaft 33. This crank shaft is formed with two aligned overhung cranks 34, one at each end, and a crank arm 35 intermediate its ends, the latter being constructed (Fig. 5) with a split box 36 adapted to surround the crank shaft and to be firmly secured, by means of the bolts 37, to the shaft. The cranks and crank arm, extend rearwardly and downwardly, the arm having pivot connection 38 with a pair of depending links 39, which in turn have pivotal connection 40 with the arch beam 3. The crank pins 41 of the cranks 34, are disposed in lateral alignment with the pivot 38, and are pivoted in pairs of links similar to links 39, said links having pivotal connections 39' with the plow beams, so that when the shaft 33 is rotated, the pivot pins of the plow beams and that of the arch bar, may be slid in the slots 31. When the pivot pins are resting in the bottom of the slots, the plows are held in a constant normal operative position.

For the purpose of rotating the shaft 33, the lever arm 42, is provided, which latter is constructed similar to the crank arm 35, so that it may be firmly set at any circumferential position on the shaft 33.

At its free end, it has pivotal connection 43 with the pull rod 44, said pull rod being provided with a longitudinal slot 45, at its outer end wherein is adapted to slide, the pin 46 extending from the side of the lever 22.

In operation, when it is desired to raise the plows, the lever 22 is manually actuated, whereby the bail axle and plow beam extensions will be raised, inasmuch as the arch bar 3, constitutes a bridge extending from the cross beam 1 to the axle, thus forming a foundation support for the lever. When the lever has been moved to the position indicated in dotted lines at *a* (Fig. 2), the pin 46 will have traveled to the end of the slot 45. A continuation of the movement of the lever, will result in the actuation of the pull rod, which in turn, will rock the shaft 33 and thereby concurrently lift the plow beams and the arch bar 3.

The parts may be raised to bring the pivot pins of the beams and bar, to the top of the slots 31 of the brackets, if desired, the plows being locked in raised position, by releasing the grip 27 from the pressure of the hand and thereby permitting the dog to engage the teeth of the segment.

As the lever arm 42 is adjustable circumferentially on the shaft 33, it is obvious, that the extent of initial movement of the plows may be arbitrarily changed, or, entirely eliminated if desired, by so adjusting the arm 42, as to bring the pivot 46 to a position in the outer end of the slot, when the plows are in their normal operative position.

Obviously, in the process of lowering the plows, the front ends of the beams will descend by gravity, simultaneously with the lowering of the plows, until the pivots 13 come to rest in the bottom of the slots 31, at which time, the plow share will assume the position indicated in dotted lines (Fig. 2) at *b* thus clearly illustrating, that the share is directed nose downward preparatory to entering the soil. From this position the plows are lowered in a pivotal movement around their respective pivots 13.

The lever 22 and its connections with the plow beams may be termed main lifting mechanism for lifting the rear end of the plows, while the crank shaft devices at the front of the frame may be termed auxiliary lifting means for the front ends of the plows.

In Figure 3, the relative position of the shares, with respect to the rear wheels and casters, is shown, as is also the central position of the arch bar 3.

We claim:

1. A lister comprising a wheeled frame having vertical adjustment at its rear portion and including a front cross beam, pairs of vertically slotted brackets carried by said beam, a plurality of plow beams carried by the frame, means guided in the slots of the brackets for pivotally and slidably connecting the forward ends of the beams and the frame to the cross beam, a crank shaft supported by the cross beam and connected to the plow beams and frame for adjusting the same in the bracket slots, and means for adjustably operating the crank shaft by and during vertically adjusting the wheeled frame.

2. A multiple bottom lister, comprising a frame, front and rear wheels supporting the frame, the rear wheels being pivotally mounted on the frame to enable them to be rolled forwardly with respect to said frame, plow beams extending longitudinally of the frame between the front and rear wheels and connected at their front ends by a vertically slidable pivot to said frame, a lifting lever on the frame, operatively connected to the axle of the rear wheels and said plow beams whereby to swing the latter upwardly when said lever is actuated, means for locking said lever to hold said plow beams in elevated position, and a transversely disposed rotatable crank shaft located above the front ends of the plow beams supported on the frame, the cranks of said crank shaft being operatively connected with the front ends of the plow beams, whereby to lift the latter when the shaft is rotated, and means operatively connecting said lever and crank shaft whereby the latter may be rotated to lift the front ends of said plow beams.

3. In an implement of the class described, the combination with a frame, front and rear wheel supports for said frame, parallel plows, the beams thereof extending forwardly and having upwardly slidable pivotal connection with said frame, said connections being constructed to render the beams movable upwardly to a limited degree from a normally constant position relative to the ground, main lifting means including an actuating lever, operatively connected to the plow beams, whereby to swing the latter upwardly upon their respective pivots when said lever is actuated, a transversely disposed rotatable crank shaft, including cranks disposed in the same plane, said shaft mounted on the frame above the pivotal connections of the plow beams, said cranks having operative connection with the front ends of said plow beams whereby to lift the latter when the shaft is rotated, a pull rod connected with said actuating lever, and extending to a point adjacent said crank shaft, and a lever arm pivotally connected at its outer end to said rod, and adjustably secured at its inner end to said crankshaft to enable its position, relative to the plane of said cranks, to be changed.

In testimony whereof we affix our signatures.

LEON W. CHASE.
WILLIAM R. McGEACHIN.
JAMES C. BRAND.

Witness:
GEORGE VOELKER.